(12) United States Patent
Binkiewicz et al.

(10) Patent No.: US 10,832,268 B2
(45) Date of Patent: Nov. 10, 2020

(54) MODELING CUSTOMER DEMAND AND UPDATING PRICING USING CUSTOMER BEHAVIOR DATA

(71) Applicant: INTERNATIONAL BUSINESS MACHINES CORPORATION, Armonk, NY (US)

(72) Inventors: Norbert M. Binkiewicz, San Mateo, CA (US); Junlei Chen, Shanghai (CN); Elizabeth J. Chester, San Francisco, CA (US); Prafulla N. Dawadi, Foster City, CA (US); Robert K. Parkin, San Francisco, CA (US); Emrah Zarifoglu, Foster City, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 283 days.

(21) Appl. No.: 15/409,806

(22) Filed: Jan. 19, 2017

(65) Prior Publication Data
US 2018/0204233 A1 Jul. 19, 2018

(51) Int. Cl.
*G06Q 10/00* (2012.01)
*G06Q 30/02* (2012.01)
(Continued)

(52) U.S. Cl.
CPC ..... *G06Q 30/0206* (2013.01); *G06Q 30/0633* (2013.01); *H04L 67/2833* (2013.01)

(58) Field of Classification Search
None
See application file for complete search history.

(56) References Cited

U.S. PATENT DOCUMENTS 6,366,890 B1 * 4/2002 Usrey .............. G06Q 10/087
705/28
7,092,918 B1 8/2006 Delurgio et al.
(Continued)

OTHER PUBLICATIONS https://stackoverflow.com/questions/34184200/finding-the-centered-average-of-a-list (Year: 2015).*

(Continued)

*Primary Examiner* — Joseph M Waesco
*Assistant Examiner* — Matheus Stivaletti
(74) *Attorney, Agent, or Firm* — Stephanie Carusillo; Andrew D. Wright; Roberts, Calderon, Safran & Cole, P.C.

(57) ABSTRACT

In an aspect of the invention, a computer-implemented method includes: receiving, by a computing device via computer network, a plurality of session data records indicating computer network browsing activity between a plurality of client devices and a merchant server hosting an online store; aggregating, by the computing device, a subset of the plurality of session data records for a single product, of a plurality of products, identified in the session data records and offered for purchase by the online store; extracting, by the computing device, features from the aggregated subset of session data records relating to customer demand for a the single product; modeling, by the computing device, customer demand for the single product based on the extracted features; optimizing, by the computing device, a price for the single product based on results of the modeling; and publishing, by the computing device, the optimized price.

20 Claims, 11 Drawing Sheets

600 ⟶

| Event Type: Cart Addition | | | | | | |
|---|---|---|---|---|---|---|
| Session ID | Product ID | Date/Time | Base Price | Shipping Speed | Average Rating | Qty |
| S12 | P01 | 2014-01-01 12:12:12 | 24 | One day | 4 | 1 |
| S23 | P01 | 2014-01-01 12:15:12 | 24 | Two day | 5 | 2 |
| S34 | P02 | 2014-01-01 01:05:06 | 300 | One day | 4.5 | 1 |
| S56 | P03 | 2014-01-03 01:06:21 | 102 | Three day | 2.3 | 5 |
| S67 | P01 | 2014-01-03 16:14:12 | 22 | One day | 4 | 5 |
| S78 | P01 | 2014-01-03 07:12:12 | 23 | One day | 4 | 3 |
| S89 | P01 | 2014-01-03 09:22:18 | 24 | Three day | 5 | 1 |

(51) Int. Cl.
*G06Q 30/06* (2012.01)
*H04L 29/08* (2006.01)

(56) References Cited

U.S. PATENT DOCUMENTS

| | | | | |
|---|---|---|---|---|
| 7,376,613 | B1* | 5/2008 | Cofino | G06Q 20/10 705/26.3 |
| 8,306,870 | B2* | 11/2012 | Mesaros | G06Q 30/0264 705/26.41 |
| 8,352,941 | B1* | 1/2013 | Protopopov | G06F 9/45558 718/1 |
| 8,762,294 | B2 | 6/2014 | Berkovitz et al. | |
| 9,965,526 | B1* | 5/2018 | Chanda | G06Q 30/0269 |
| 2003/0149603 | A1* | 8/2003 | Ferguson | G06Q 30/06 705/64 |
| 2003/0200156 | A1* | 10/2003 | Roseman | G06Q 30/0641 705/26.44 |
| 2007/0244767 | A1* | 10/2007 | Goel | G06Q 30/0601 705/26.7 |
| 2008/0294996 | A1* | 11/2008 | Hunt | G06Q 30/02 715/739 |
| 2009/0144123 | A1* | 6/2009 | Malov | G06Q 10/04 705/7.29 |
| 2009/0210286 | A1 | 8/2009 | Bisdikian | |
| 2010/0324972 | A1 | 12/2010 | Brooke et al. | |
| 2012/0226585 | A1 | 9/2012 | Kogan et al. | |
| 2012/0323682 | A1* | 12/2012 | Shanbhag | G06Q 30/0601 705/14.51 |
| 2013/0018713 | A1* | 1/2013 | Kumar | G06Q 30/0201 705/14.12 |
| 2013/0211914 | A1* | 8/2013 | Reddy | G06Q 30/02 705/14.54 |
| 2013/0304541 | A1 | 11/2013 | Sloan et al. | |
| 2014/0195380 | A1* | 7/2014 | Jamtgaard | H04L 67/02 705/26.61 |
| 2014/0278804 | A1* | 9/2014 | Lanxner | G06Q 30/0206 705/7.35 |
| 2014/0324537 | A1 | 10/2014 | Gilbert | |
| 2015/0066594 | A1 | 3/2015 | Li et al. | |
| 2015/0073929 | A1* | 3/2015 | Psota | G06Q 30/0241 705/26.2 |
| 2015/0363805 | A1* | 12/2015 | Tibau-Puig | G06Q 30/0206 705/7.35 |
| 2016/0055495 | A1 | 2/2016 | Qin et al. | |
| 2016/0378943 | A1* | 12/2016 | Vallee | G06N 3/04 705/2 |
| 2017/0046011 | A1* | 2/2017 | Piper | H04L 67/22 |
| 2020/0019644 | A1* | 1/2020 | Mazouchi | H04L 67/306 |

OTHER PUBLICATIONS https://stackoverflow.conn/questions/34184200/finding-the-centered-average-of-a-list (Year: 2015).*
SleBluue (Dec. 2015). Finding the centered average of a list. https://stackoverflow.com/questions/34184200/finding-the-centered-average-of-a-list (Year: 2015).*
Chen, L., Mislove, A., & Wilson, C. (Apr. 2016). An empirical analysis of algorithmic pricing on amazon marketplace. In Proceedings of the 25th International Conference on World Wide Web (pp. 1339-1349) (Year: 2016).*
Roberts, "Application of a Gaussian, Missing-Data Model to Product Recommendation", IEEE Signal Processing Letters, vol. 17 (5), 2010, pp. 509-512.
Mell et al., "The NIST Definition of Cloud Computing", NIST, Special Publication 800-145, Sep. 2011, 7 pages.

* cited by examiner

Event Type: Cart Addition

| Session ID | Product ID | Date/Time | Base Price | Shipping Speed | Average Rating | Qty |
|---|---|---|---|---|---|---|
| S12 | P01 | 2014-01-01 12:12:12 | 24 | One day | 4 | 1 |
| S23 | P01 | 2014-01-01 12:15:12 | 24 | Two day | 5 | 2 |
| S34 | P02 | 2014-01-01 01:05:06 | 300 | One day | 4.5 | 1 |
| S56 | P03 | 2014-01-03 01:06:21 | 102 | Three day | 2.3 | 5 |
| S67 | P01 | 2014-01-03 16:14:12 | 22 | One day | 4 | 5 |
| S78 | P01 | 2014-01-03 07:12:12 | 23 | One day | 4 | 3 |
| S89 | P01 | 2014-01-03 09:22:18 | 24 | Three day | 5 | 1 |

Aggregate Data for 2014-01-01
Event Type: Cart Item Additions

| Product ID | Date | Time Period | Average Base Price | Shipping 1-day | Shipping 2-day | Shipping 3-day | Average Rating | Qty |
|---|---|---|---|---|---|---|---|---|
| P01 | 2014-01-01 | 2 | 24 | 1 | 1 | 0 | 4.5 | 1.5 |
| P02 | 2014-01-01 | 1 | 300 | 1 | 0 | 0 | 4.5 | 1 |
| P03 | 2014-01-01 | 1 | 102 | 0 | 0 | 1 | 2.3 | 5 |

700

Input Aggregate Data for Product ID: P01
Event Type: Cart Item Additions

| Date | Time Period | Average Base Price | Shipping 1-day | Shipping 2-day | Shipping 3-day | Average Rating | Qty |
|---|---|---|---|---|---|---|---|
| 2014-01-01 | 2 | 24 | 1 | 1 | 0 | 4.5 | 1.5 |
| 2014-01-03 | 1 | 23.5 | 1 | 0 | 1 | 4.5 | 2 |
| 2014-01-03 | 2 | 22 | 1 | 0 | 0 | 4 | 5 |

Preprossed Aggregated Data for Product ID: P01
Event Type: Cart Item Additions

| Date | Time Period | Base Price | Shipping 1-day | Shipping 2-day | Shipping 3-day | Average Rating | Qty |
|---|---|---|---|---|---|---|---|
| 2014-01-01 | 1 | 24 | 1 | 1 | 0 | 4.5 | 1.5 |
| 2014-01-01 | 2 | 24 | 1 | 1 | 0 | 4.5 | 1.5 |
| 2014-01-02 | 1 | 24 | 1 | 1 | 0 | 4.5 | 1.5 |
| 2014-01-02 | 2 | 24 | 1 | 1 | 0 | 4.5 | 1.5 |
| 2014-01-03 | 1 | 23.5 | 1 | 0 | 1 | 4.5 | 2 |
| 2014-01-03 | 2 | 22 | 1 | 0 | 0 | 4 | 5 |

FIG. 8

Extracted Feature Data for Product ID: P01
Event Type: Cart Item Additions

| Date | Time Period | Base Price | Shipping 1-day | Shipping 2-day | Shipping 3-day | Centered-Average Rating | Log-Qty |
|---|---|---|---|---|---|---|---|
| 2014-01-01 | 1 | 24 | 1 | 1 | 0 | 0.09 | 0.17 |
| 2014-01-01 | 2 | 24 | 1 | 1 | 0 | 0.09 | 0.17 |
| 2014-01-02 | 1 | 24 | 1 | 1 | 0 | 0.09 | 0.17 |
| 2014-01-02 | 2 | 24 | 1 | 1 | 0 | 0.09 | 0.17 |
| 2014-01-03 | 1 | 23.5 | 1 | 0 | 1 | 0.09 | 0.3 |
| 2014-01-03 | 2 | 22 | 1 | 0 | 0 | 0.41 | 0.69 |

FIG. 9

MODELING CUSTOMER DEMAND AND UPDATING PRICING USING CUSTOMER BEHAVIOR DATA

BACKGROUND

The present invention generally relates to dynamic pricing of products and, more particularly, to dynamic pricing based on online retail behavioral data.

Traditional pricing systems are static and do not consider dynamic changes in customer demand. Current dynamic pricing solutions utilize rules and tests based systems for dynamic pricing. These systems adjust product prices using predefined pricing rules or test results based on behavior of small samples. The rules can be based on competitor price changes, inventory levels, sales objectives, and anticipated changes in demand. Purely rule based pricing systems require analysts to manually set pricing rules for each product or group of products. Revenue optimization depends on the quality of the specified rules.

SUMMARY

In an aspect of the invention, a computer-implemented method includes: receiving, by a computing device via computer network, a plurality of session data records indicating computer network browsing activity between a plurality of client devices and a merchant server hosting an online store; aggregating, by the computing device, a subset of the plurality of session data records for a single product, of a plurality of products, identified in the session data records and offered for purchase by the online store; extracting, by the computing device, features from the aggregated subset of session data records relating to customer demand for the single product; modeling, by the computing device, customer demand for the single product based on the extracted features; optimizing, by the computing device, a price for the single product based on results of the modeling; and publishing, by the computing device, the optimized price.

In an aspect of the invention, there is a computer program product for modeling customer demand based on a plurality of session data records and optimizing price. The computer program product includes a computer readable storage medium having program instructions embodied therewith, the program instructions executable by a computing device to cause the computing device to: monitor computer network browsing activity between a plurality of client devices and a merchant server; generate a plurality of session data records having details regarding the computer network browsing activity between the plurality of client devices and a merchant server hosting an online store; aggregate a subset of the plurality of session data records for a single product, of a plurality of products, identified in the session data records and offered for purchase by the online store; extract features from the aggregated subset of session data records relating to customer demand for the single product; model customer demand for the single product based on the extracted features; optimize a price for the single product based on results of the modeling; and publish the optimized price.

In an aspect of the invention, a system includes: a CPU, a computer readable memory and a computer readable storage medium associated with a computing device; program instructions to gather session level data from online customer retail activity; program instructions to aggregate, for a product, the session level data pertaining to the product; program instructions to substitute values as a replacement for missing data in the aggregated session level data to generate a complete data set; program instructions to extract one or more features of online customer behavior based on an analysis of the complete data set; program instructions to determine a level of customer demand for the product based on the one or more features of online customer behavior; and program instructions to modify a price of the product based on the level of customer demand. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

FIG. 6 shows an example data structure representing session level data records for product cart additions in accordance with aspects of the present invention.

FIG. 7 shows example data structures representing aggregated session level data based on the data structure of FIG. 6 in accordance with aspects of the present invention.

FIG. 8 shows an example data structure representing preprocessed aggregated data for a particular product and event type in accordance with aspects of the present invention.

FIG. 9 shows an example data structure representing extracted features data for a particular product and event type in accordance with aspects of the present invention.

DETAILED DESCRIPTION

Figure 1:
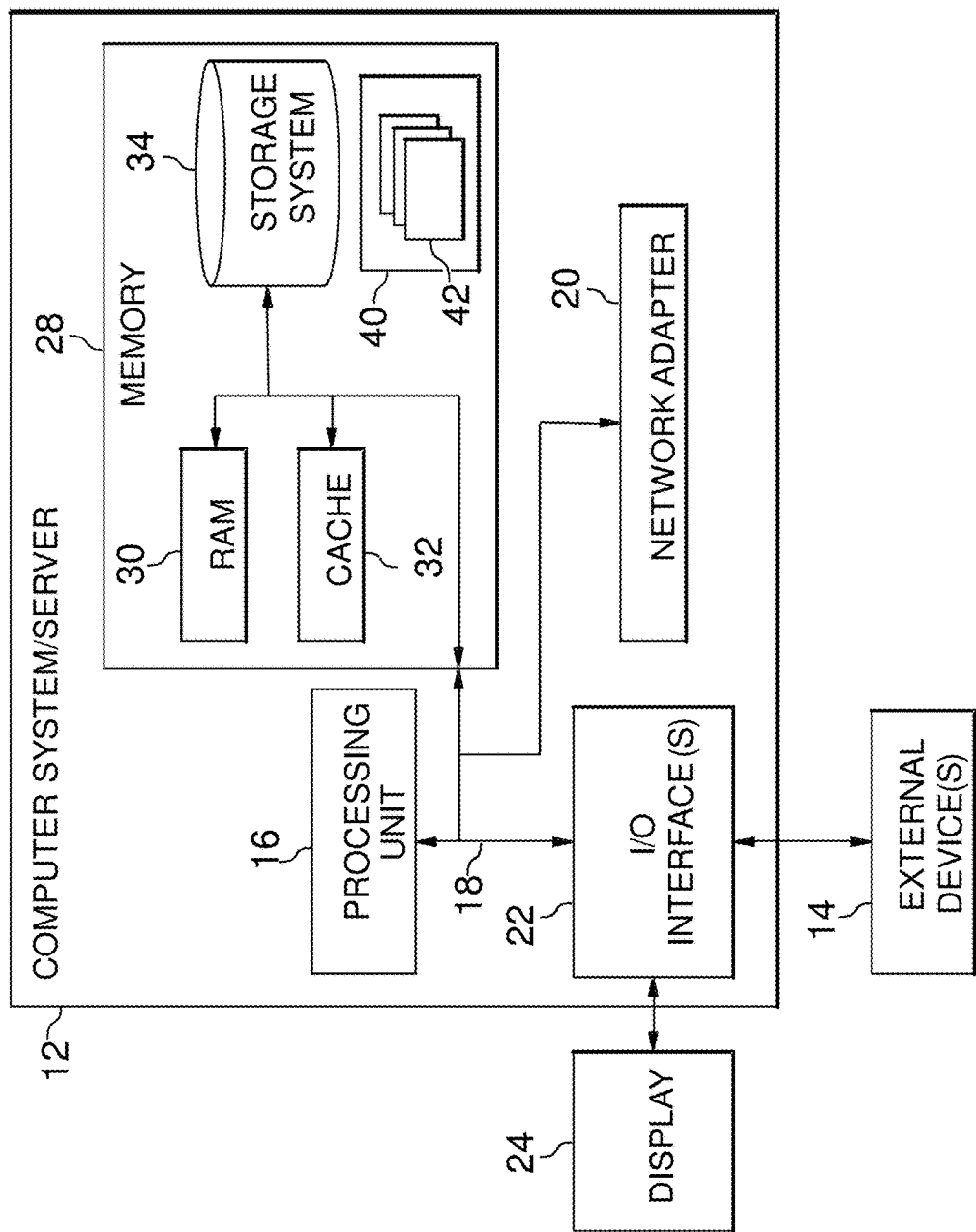
FIG. 1 depicts a cloud computing node according to an embodiment of the present invention.

The present invention generally relates to dynamic pricing of products and, more particularly, to dynamic pricing based on online retail behavioral data. Aspects of the present invention may include systems and/or methods that may model and/or predict changes in customer demand based on online behavioral data collected by online retailers. Further, aspects of the present invention may include a dynamic pricing system that optimizes product prices based on the predicted customer demand changes for revenue maximization.

As described herein, a demand modeling and pricing system may gather session level data from online merchants. As described herein, an online merchant may record session level data identifying attributes of the user's browsing activity that relate to product demand. Specifically, the online merchant may store a record based on the occurrence of an event (e.g., each time a user accesses a webpage describing a product for sale, each time a user adds a product to the user's online shopping cart, and/or each time a user purchases a product from the user's shopping car). Each record may identify data relating to product demand. For example, a record may include a product identifier to identify the product (e.g., the product viewed, added to a shopping cart, or bought from a shopping cart). Additionally, or alternatively, the record may include a date and time for the event (e.g., date and time for when the product was viewed, added to the shopping cart, or bought from the shopping cart). Additionally, or alternatively, the record may identify a price of the product at the time of the event, a shipping speed (e.g., express shipping, standard shipping, economy shipping, etc.), a customer feedback rating, a quantity, etc.).

From the session level data, a demand modeling and pricing system may extract features or attributes from the session level data that relate to customer demand for a particular product. These features are used to model and predict customer demand for the product as a function of price. An optimal price for the product may be determined based on the predicted demand. The process of determining optimal price may be repeated for individual products. In this way, prices may be adjusted based on short term changes in demand. Further, the demand modeling and pricing system may self-adjust to market response to price changes, may set prices to optimize custom criteria for revenue, sales, or profit, and may modify the demand model to suite available data. In embodiments, session level data may be continuously monitored and recorded as browsing activity between client devices and an online retailer continues. In this way, customer demand modeling is updated periodically, and accordingly, prices are continuously optimized and published.

Aspects of the present invention are based on data records from an online merchant or e-commerce environment in which customer demand is represented by browsing data included in session level data. Session level data may include hundreds, thousands, or tens of thousands of data records of user web browsing activity in a relatively short amount of time. Accordingly, it is emphasized that the aspects of the present invention require the use of computing devices and computer networks. Also, aspects of the present invention transform raw data records (e.g., session level data) into a usable form (e.g., demand models and pricing information) which in turn is used for a specific and useful application of improving revenue. As is described herein, aspects of the present invention discuss non-conventional and non-routine steps of receiving session data from an online merchant, aggregating the session data for a product, preprocessing the aggregated session data, extracting features from the preprocessed aggregated data, modeling customer demand based on extracted features and model specifications, and optimizing price based on model results and business rules.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
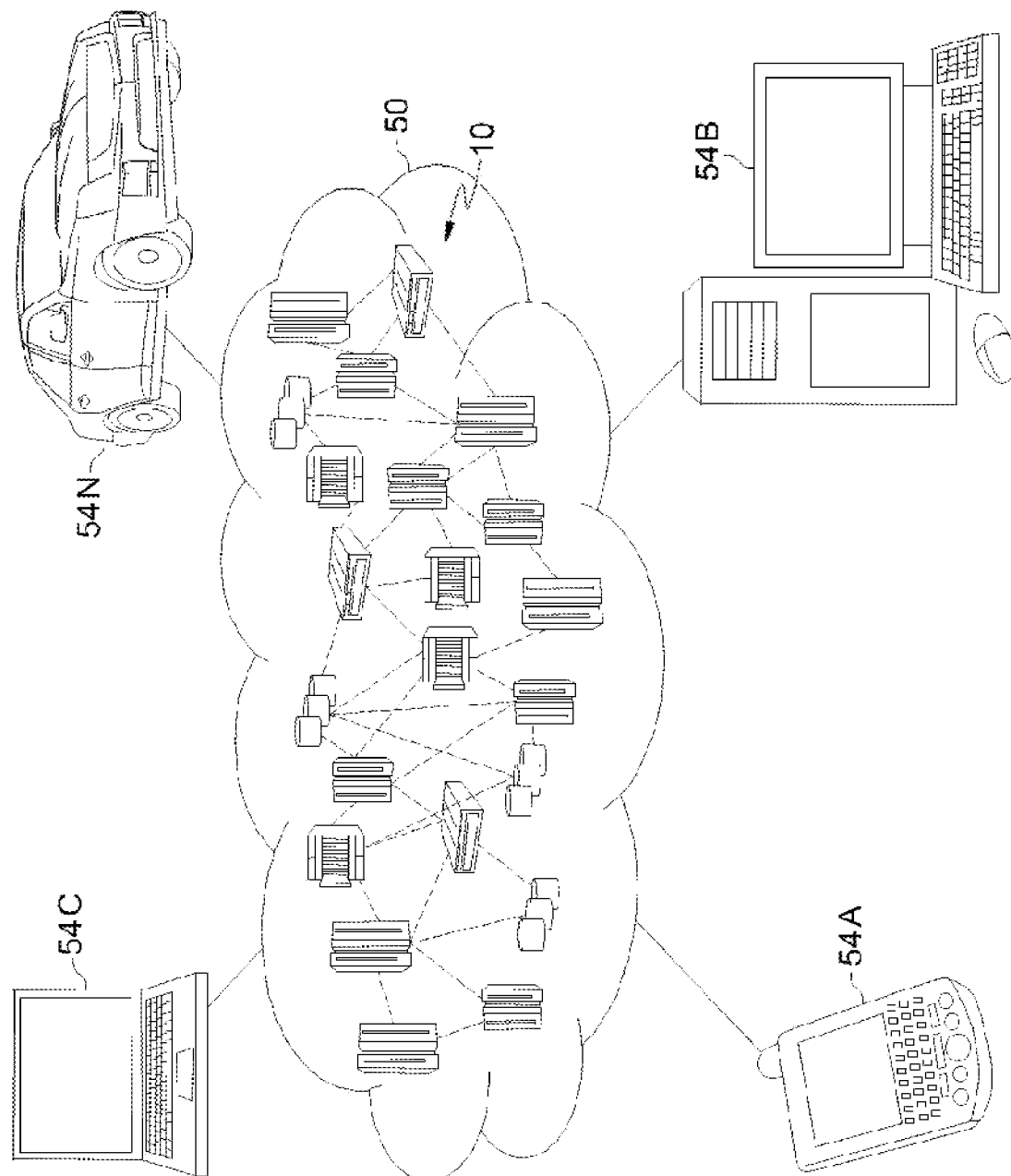
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
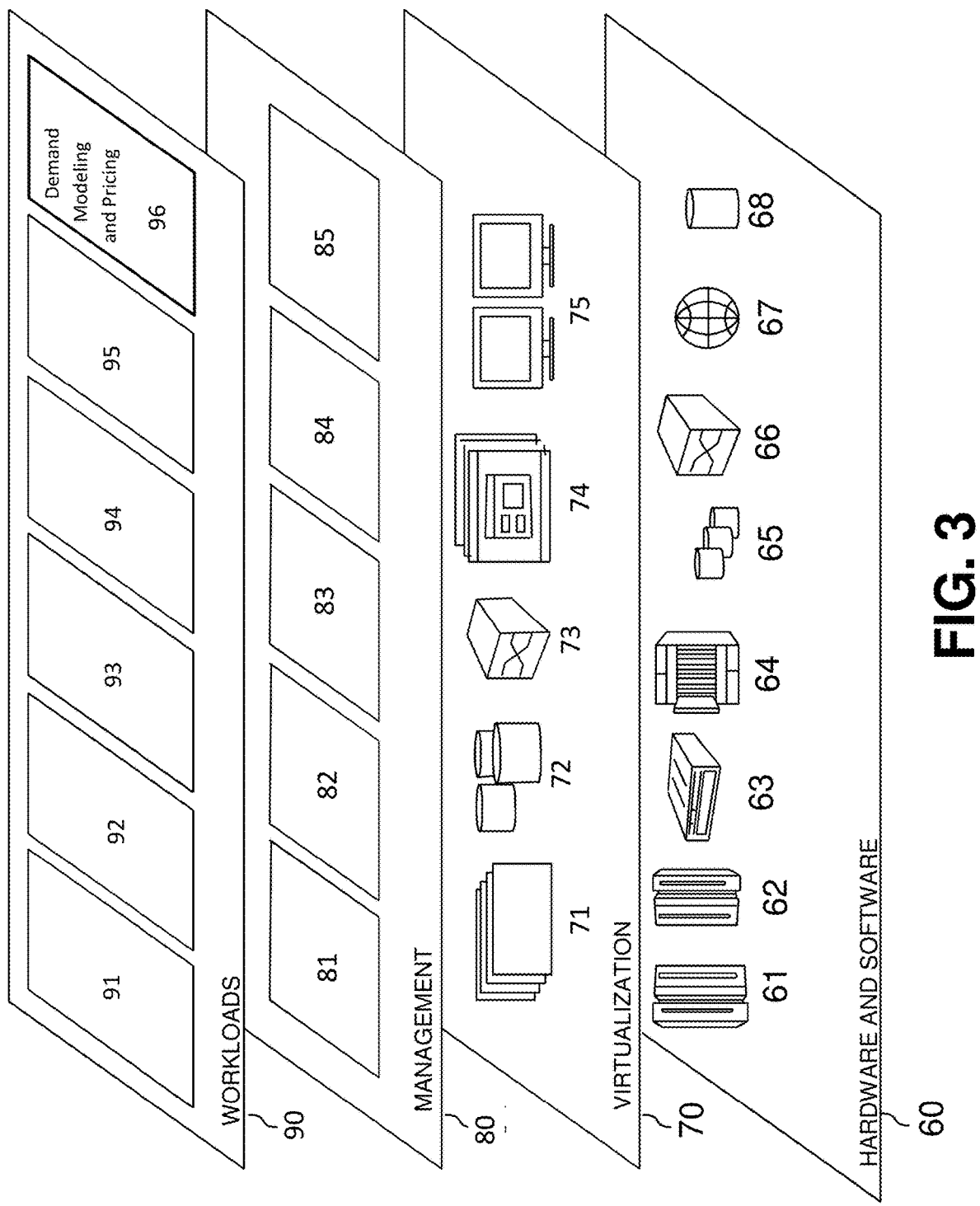
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and demand modeling and pricing 96.

Referring back to FIG. 1, the program/utility 40 may include one or more program modules 42 that generally carry out the functions and/or methodologies of embodiments of the invention as described herein (e.g., such as the functionality provided by demand modeling and pricing 96). Specifically, the program modules 42 may receive session data from an online merchant, aggregate the session data for a product, preprocesses the aggregated session data, extract features from the preprocessed aggregated data, model customer demand based on extracted features and model specifications, and optimize price based on model results and business rules. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a demand modeling and pricing server 230 shown in FIG. 4.

Figure 4:
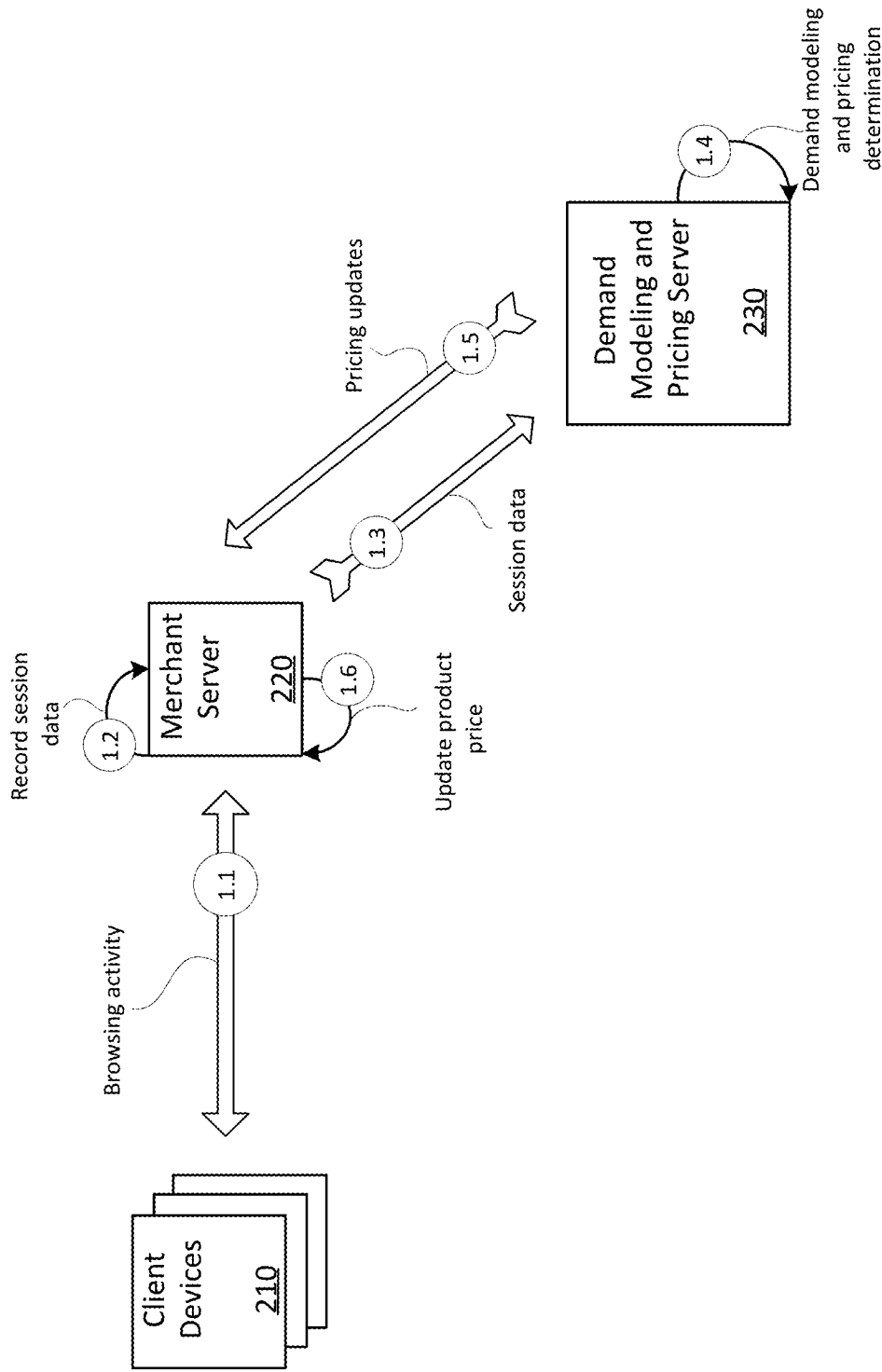
FIG. 4 shows an overview of an example implementation in accordance with aspects of the present invention

FIG. 4 shows an overview of an example implementation in accordance with aspects of the present invention. As shown in FIG. 4, client devices 210 may communicate with a merchant server 220 as users of the client devices 210 browse a web page or online store hosted by the merchant server 220 (step 1.1). The merchant server 220 may record session data relating to the browsing activity and communications between the merchant server 220 and the client device 210 (step 1.2). For example, as described herein, the merchant server 220 may generate a session level record identifying attributes of the user's browsing activity that relate to product demand. Specifically, the merchant server 220 may store a record based on the occurrence of an event (e.g., each time a user accesses a webpage describing a product for sale, each time a user adds a product to the user's online shopping cart, and/or each time a user purchases a product from the user's shopping car). Each record may identify data relating to product demand. For example, a record may include a product identifier to identify the product (e.g., the product viewed, added to a shopping cart, or bought from a shopping cart). Additionally, or alternatively, the record may include a date and time for the event (e.g., date and time for when the product was viewed, added to the shopping cart, or bought from the shopping cart). Additionally, or alternatively, the record may identify a price of the product at the time of the event, a shipping speed (e.g., express shipping, standard shipping, economy shipping, etc.), a customer feedback rating, a quantity, etc.).

At step 1.3, the merchant server 220 may provide the session data (e.g., the session level records) to the demand modeling and pricing server 230. At step 1.4, the demand modeling and pricing server 230 may model the demand of individual products offered via the merchant server 220 based on the session data. As an example, the demand modeling and pricing server 230 may aggregate session data for a particular product. The aggregated data may identify product demand activity at different time periods (e.g., product views, product cart additions, product purchases, etc.). For example, the aggregated data may identify an average price, average shipping speed, and/or average customer rating within a particular time period when the product was subject to an event (e.g., when the product was viewed, added to customer carts, purchased from carts, etc.).

As described in greater detail with respect to FIG. 7, aggregated data may be collected into a data structure in which each row of the data structure identifies aggregated data for a time period. The demand modeling and pricing server 230 may preprocess the aggregated session data by interpolating any data that may be missing within certain time periods (e.g., in a case in which products were viewed, but not purchased). For example, as described in greater detail with respect to FIG. 8, session level data may not exist for certain time periods, and accordingly, the demand modeling and pricing server 230 may populate empty fields in the data structure to complete the data set. The demand modeling and pricing server 230 may then extract features relating to product demand from the completed data set. For example, the extracted features may include a centered average user rating, a log value of a quantity of items purchased, etc. Demand may be modeled based on the extracted features and/or custom model specifications. Further, price may be optimized based on the model results and/or business rules (e.g., rules identifying price points based on model results).

With continued reference to FIG. 4, at step 1.5, the demand modeling and pricing server 230 may provide information regarding pricing updates to the merchant server 220, and at step 1.6, the merchant server 220 may update the product's price accordingly. In this way, the demand modeling and pricing server 230 may dynamically update product pricing based on session level data that indicates customer demand. As a result, revenue may be improved for online retailers.

Figure 5:
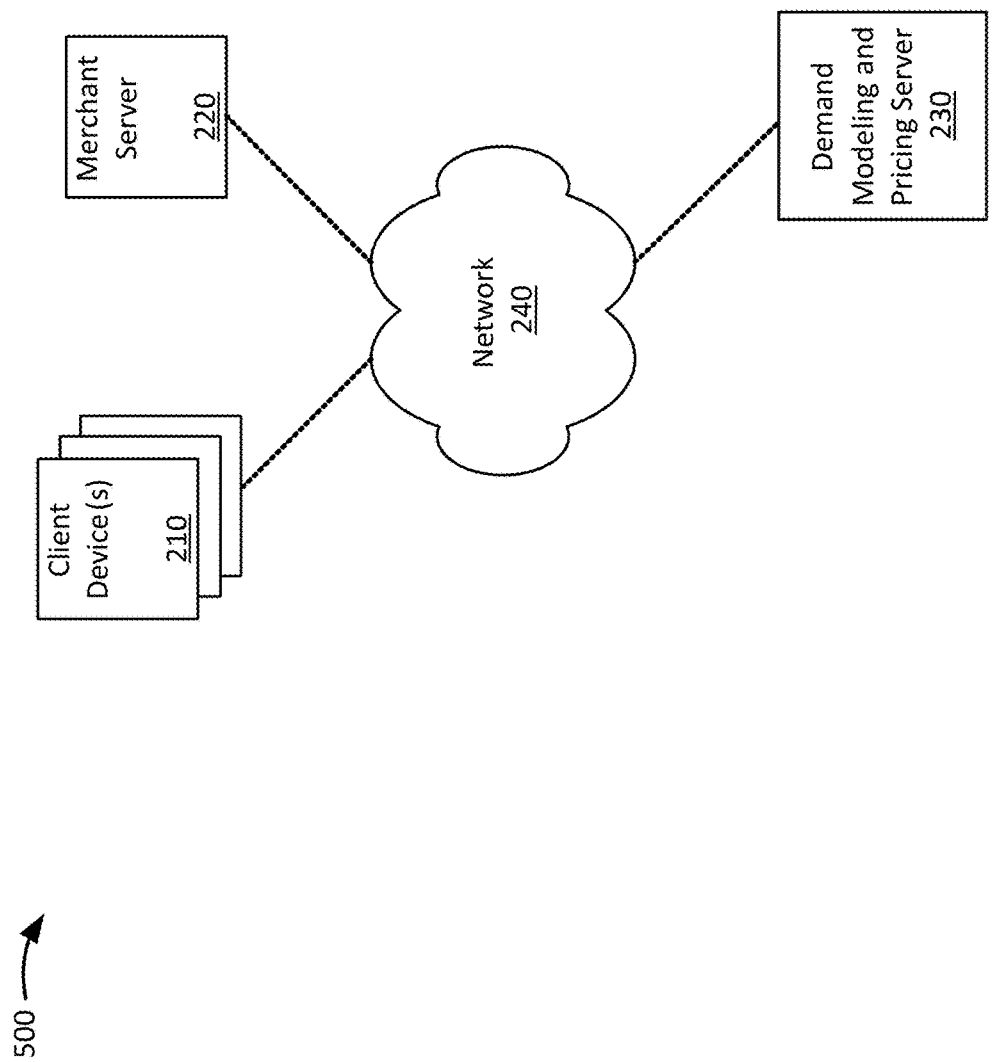
FIG. 5 shows an example environment in accordance with aspects of the present invention.

FIG. 5 shows an example environment in accordance with aspects of the present invention. As shown in FIG. 5, environment 500 may include client device(s) 210, merchant server 220, demand modeling and pricing server 230, and network 240. In embodiments, one or more components in environment 500 may correspond to one or more components in the cloud computing environment of FIG. 2. In embodiments, one or more components in environment 200 may include the components of computer system/server 12 of FIG. 1.

The client device 210 may include a device capable of communicating via a network, such as the network 240. For example, the client device 210 may correspond to a mobile communication device (e.g., a smart phone or a personal digital assistant (PDA)), a portable computer device (e.g., a laptop or a tablet computer), a desktop computing device, and/or another type of computing device. In some embodiments, the client device 210 may be used by a user to access an online store hosted by the merchant server 220.

The merchant server 220 may include one or more computing/server devices, such as the computer system/server device 12 of FIG. 1, that hosts an online store accessible via a computer network, such as the network 240. As described herein, the merchant server 220 may generate session level data records based on browsing communications between the merchant server 220 and the client device 210. The session level data records may include information relating customer demand levels/patterns for a product at different times.

The demand modeling and pricing server 230 may include one or more computing/server devices that models customer demand based on session level data gathered by the merchant server 220. Further, the demand modeling and pricing server 230 may determine pricing updates based on the results of the model, as described in greater detail herein.

The network 240 may include network nodes, such as network nodes 10 of FIG. 2. Additionally, or alternatively, the network 240 may include one or more wired and/or wireless networks. For example, the network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 235 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

FIG. 6 shows an example data structure 600 representing session level data records for product cart additions. As shown in FIG. 6, data structure 600 may include a header identifying an event type (e.g., "cart additions" in which products are added to users' carts). Each row below the header represents a data record from a session between a client device 210 and merchant server 220. Each row may store attributes of the session, such as a session ID, a product ID for a product, a data and time corresponding to the event (e.g., data and time for when a corresponding product was added to a cart), a price of the product at the time of the event, a selected shipping speed corresponding to the event, an average customer rating at the time of the event, and a product quantity (e.g., a quantity of items added to the cart). As a specific example, data structure 600 may store a session level data record with session ID of S12 showing that a quantity of one of product having the product ID of P01 was added to a cart on Jan. 24, 2014. At the time the product was added to the cart, the price of the product was 24, the average rating of the product was 4, and shipping speed was one day.

The session level data stored by data structure 600 may be recorded by the merchant server 220 as client devices 210 communicate with the merchant server 220 (e.g., as users browse product web pages hosted by the merchant server 220). The session level data stored by the data structure 600 may be provided to the demand modeling and pricing server 230 (e.g., in order for the demand modeling and pricing server 230 to aggregate, process, and/or model the session level data). Also, session level data may be stored for other event types (e.g., cart item purchases, product views, etc.).

FIG. 7 shows example data structures 700 and 750 representing aggregated session level data based on data structure 600 of FIG. 6. As shown in FIG. 7, data structure 700 may include a header identifying a single date and an event type. In the example shown, data structure 700 represents aggregated session level data for the date "Jan. 1, 2014" for the event type "cart item additions." Each row in data structure 700 represents an aggregation of the session level data records from data structure 600 for the date identified in the header. Each row also represents an aggregation of the session level data records at each time period. For example, a day may be divided into two time periods (e.g., one time period from 00:00:00 to 11:59:59 and another time period from 12:00:00 to 23:59:59). In embodiments, the information stored by the data structures 700 and 750 may be based on data of various other forms other information other than online session data.

Referring back to data structure 600 in FIG. 6, two data records were stored for product ID P01 within time period two on Jan. 1, 2014. Accordingly, data structure 700 stores a row of data identifying the average base price for these two data records (e.g., an average price of 24 since both records had a price of 24), a number of records with one-day shipping speed (e.g., one record), a number of records with two day shipping speed (one record), an average customer rating (4.5 being the average of a record with a rating of 4 and the other record with a rating of 5), and an average quantity (1.5 being the average of a record with a quantity of 2 and the other record with a quantity of 1). Similarly, data structure 700 stores a row of data identifying the average base price, shipping speeds, average ratings, and quantities for products P02 and P03 on Jan. 1, 2014. Since only one record was stored for products, P02 and P03, the data in data structure 700 matches that of data structure 600. In embodiments, aggregate data for multiple dates may be generated such that a data structure 700 is generated for other dates (e.g., for Jan. 2, 2014; Jan. 3, 2014, etc.). Also a data structure 700 may be generated for other event types (e.g., product views, cart purchases, etc.).

Data structure 750 stores aggregate data for a particular product (e.g., product ID P01) for a particular event type (e.g., cart item additions). Information stored by data structure 750 may be based on the data stored by data structure 600 and 700. For example, an entry or row in data structure 750 stores date, time period, average base price, shipping speed counts, average rating, and average quantity. As an example, data structure 750 may store aggregated data for product P01 for time period two on date Jan. 1, 2014. The aggregated data for this row of data may correspond to the data from the row in data structure 700 associated with product P01 and the date of Jan. 1, 2014.

A subsequent row in data structure 750 may store aggregated data for product P01 for the time period one on date Jan. 3, 2014. The aggregate data for this row of data may correspond to data for product P01 for the date Jan. 3, 2014 (as would be stored in a different data structure 700 associated with the data Jan. 3, 2014). Also, the aggregate data for this row of data may be derived from data structure 600. For example, referring back to data structure 600, session IDs S78 and S89 represent session data records for product P01 during time period one on Jan. 3, 2014. Accordingly, data structure 750 stores an entry with the aggregated data for session IDs S78 and S89. For example, data structure 750 stores an entry showing a time period of one, an average base price of 23.5 (e.g., corresponding to the average price of 23 and 24 from records with session IDs S78 and S89 from data structure 600), one one-day shipping speed count (e.g., from session data record S78), one three day shipping speed count (e.g., from session data record S89), an average customer rating of 4.5 (from a customer rating of four from session data record S78 and a customer rating of five from session data record S89), and a quantity of 2 (a quantity of three from session data record S78 and a quantity of one from session data record S89). Data structure 750 may also store an entry for Jan. 3, 2014, time period two. Since data structure 600 only stores one entry for Jan. 3, 2014, time period two for product P01, the entry in data structure 750 may match that of data structure 600.

FIG. 8 shows an example data structure 800 representing preprocessed aggregated data for a particular product and event type. Similar to data structure 750, data structure 800 may include a header that identifies product ID P01 and an event type of cart item additions. The data from data structure 800 is based on the data from data structure 750. As described herein, data stored in data structure 800 includes interpolated data for data that was not present in data structure 750. For example, referring to data structure 750, a row does not exist for the date of Jan. 1, 2014, time period one. Further, a row does not exist for Jan. 2, 2014, time period one, or Jan. 2, 2014, time period two. Accordingly, in data structure 800, the "missing" data is populated with data (e.g., substitute values) to reflect data from other rows in which data exists (e.g., as shown by the shaded rows in data structure 800). In embodiments, data may be missing in a situation where a product was viewed, but not added to the cart. Missing rows may also be noted as "zero sales" and information regarding zero sales may be used to model customer demand.

FIG. 9 shows an example data structure 900 representing extracted features data for a particular product and event type. Similar to data structure 750 and data structure 800, data structure 900 may include a header that identifies product ID P01 and an event type of cart item additions. The data from data structure 900 is based on the data from data structure 750 and/or data structure 800. In embodiments, data structure 900 may extract features, which may include, for example, data of data structure 800 with statistical operations applied. For example, data structure 900 may include a "centered average rating" and a Log value of the aggregate quantity data from data structure 800. Additionally, or alternatively, feature extraction may include transforming a single data column, combining multiple columns into a single feature, and/or representing a single column in the form of one-hot encoded columns. From the extracted features data represented by data structure 900, customer demand may be modeled. For example, a log-linear regression of sales versus price and additional features may be used to model product level customer demand.

Figure 10:
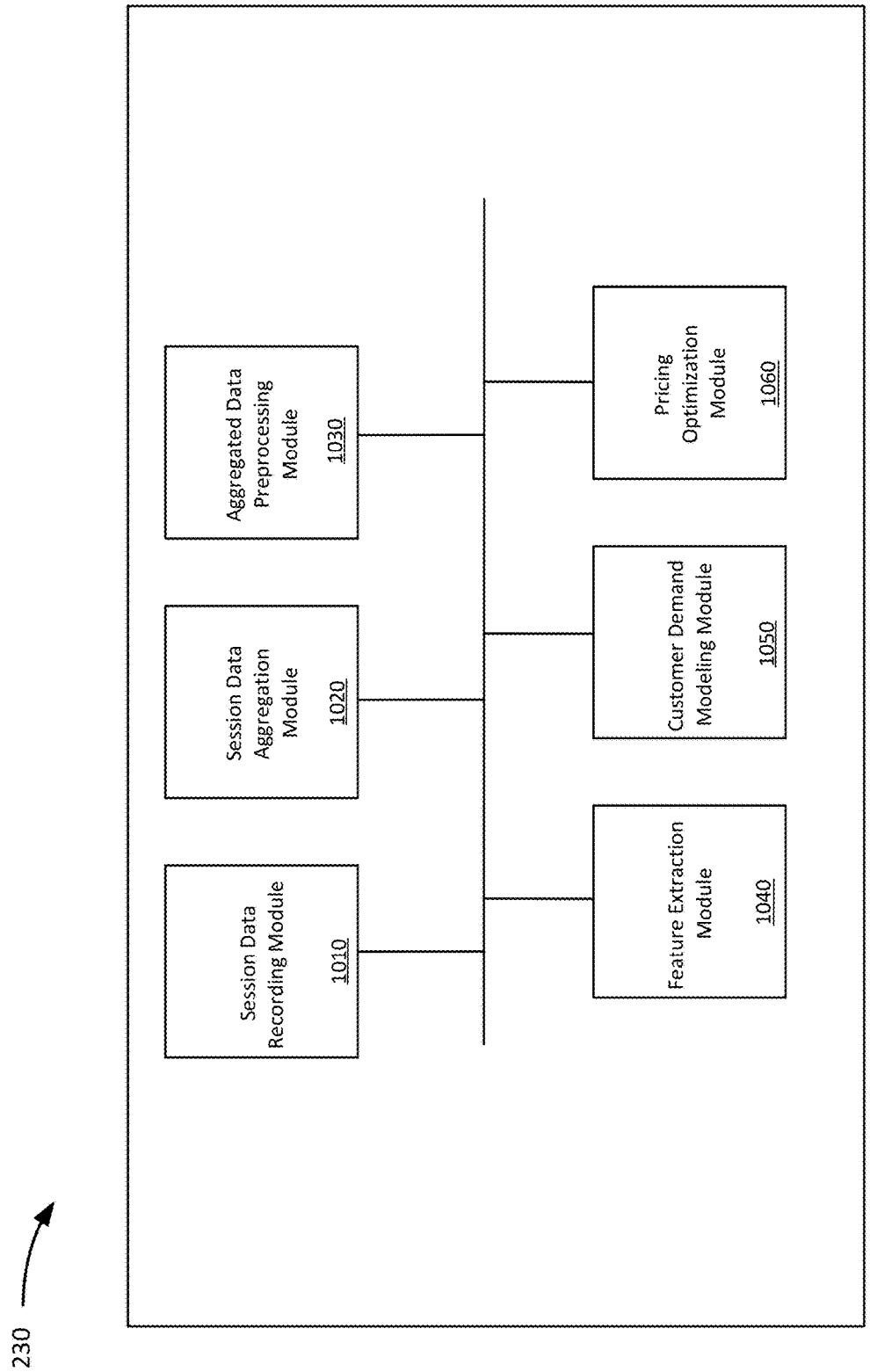
FIG. 10 shows a block diagram of example components of a demand modeling and pricing server in accordance with aspects of the present invention.

FIG. 10 shows a block diagram of example components of a demand modeling and pricing server in accordance with aspects of the present invention. As shown in FIG. 10, the demand modeling and pricing server 230 may include a session data recording module 1010, a session data aggregation module 1020, a aggregated data preprocessing module 1030, a feature extraction module 1040, a customer demand modeling module 1050, and a price optimization module 1060. In embodiments, the demand modeling and pricing server 230 may include additional or fewer components than those shown in FIG. 10. In embodiments, separate components may be integrated into a single computing component or module. Additionally, or alternatively, a single component may be implemented as multiple computing components or modules.

The session data recording module 1010 may include a program module (e.g., program module 42 of FIG. 1) that records session data records based on communications between the client devices 210 and the merchant server 220. Each data record may be recorded based on the occurrence of a shopping-related event (e.g., each time a client device 210 access a product description page, adds an item to a card, purchases an item, etc.). Each data record may identify a session ID, a product ID, a date/time (corresponding to a date and time period designation), a base price, a shipping speed, an average customer rating, a quantity, etc. Examples of session data records are described above with respect to data structure 600 in FIG. 6.

The session data aggregation module 1020 may include a program module (e.g., program module 42 of FIG. 1) that aggregates session data for multiple products corresponding to a particular event type and day. In embodiments, the session data aggregation module 1020 may aggregate the session data by product ID, date, and time period, such that each aggregated record identifies an average price, shipping speed counts, average customer rating, and average quantity.

Examples of aggregated session data are described above with respect to data structure 700 and data structure 750 in FIG. 7.

The aggregated data preprocessing module 1030 may include a program module (e.g., program module 42 of FIG. 1) that preprocesses the aggregated data generated by the session data aggregation module 1020. For example, the aggregated data preprocessing module 1030 may preprocess the aggregated data by "filling in the blanks" or populating data for which aggregated data does not exist (with substitute values). Examples and further descriptions of preprocessing the aggregated data are described above with respect to data structure 800 in FIG. 8.

The feature extraction module 1040 may include a program module (e.g., program module 42 of FIG. 1) that extracts features from the preprocessed aggregated data. For example, the feature extraction module 1040 may apply statistical operations to the preprocessed aggregated data to better represent customer demand. Additionally, or alternatively, feature extraction may include transforming a single data column, combining multiple columns into a single feature, and/or representing a single column in the form of one-hot encoded columns. Examples and further descriptions regarding extracted features are described above with respect to data structure 900 in FIG. 9.

The customer demand modeling module 1050 may include a program module (e.g., program module 42 of FIG. 1) that models customer demand using, for example, the extracted feature data generated by the feature extraction module 1040. For example, a log-linear regression of sales versus price and additional features may be used to model product level customer demand. Additionally, or alternatively, other types of models may be used based on the extracted feature data. In embodiments, the customer demand modeling module 1050 may model the customer demand based on model specifications provided by a user or analyst. For example, the customer demand modeling module 1050 may receive model specifications, such as the type of model to generate, the type of modeling algorithms to use, and the types of features to consider, disregard, or weigh more heavily when generating the model.

The price optimization module 1060 may include a program module (e.g., program module 42 of FIG. 1) that determines an optimized price for a product based on the results of the customer demand model generated by the customer demand modeling module 1050. As described herein, an optimized price may refer to a price that maximizes a business value, such as profit, revenue, quantity of sales, or the like. In embodiments, the price optimization module 1060 may determine an optimized price for a product further based on business rules received from an administrator. For example, the optimized price may be determined based on business rules or business objective criterion such as sales, revenue, profit, etc.

As an example, an optimized price may be determined based on a model that may be derived from the information from data structure 900 of FIG. 9, as follows:

$$\log(qty+1) = \alpha_1 * \text{shipping1day} + \alpha_2 * \text{shipping2day} + \alpha_3 * \text{shipping3day} + \alpha_4 * \text{rating} + \beta * \text{price} = C + \beta * \text{price} \quad (1)$$

where $\alpha$ and $\beta$ are the coefficients estimated and $C = \alpha_1 * \text{shipping1day} + a_2 * \text{shipping2day} + \alpha_3 * \text{shipping3day} + \gamma * \text{rating}$ Equation (1) simplifies to:

$$qty = \exp(C + \beta * \text{price}) - 1 \quad (2)$$

Equation (2) may be optimized to maximize revenue and profit. For example, maximum revenue may be determined as:

$$\text{revenue} = qty * \text{price} = \exp(C + \beta * \text{price}) * \text{price} \quad (3)$$

For a given cost, maximized profit may be determined as:

$$\text{profit} = \text{revenue} - \text{cost} = (\exp(C + \beta * \text{price}) * \text{price} - \text{cost}) \quad (4)$$

Optimization techniques may then be used to maximize revenue based on equation (3) or to maximize profit based on equation (4). In embodiments, a threshold can be determined as a maximum profit or revenue based on the above model. Optimal price may be determined as one that satisfies this threshold. As should be understood by those of ordinary skill in the art, other techniques and variations for determining an optimal price that are within the scope and spirit of the above description may be used.

Information regarding the optimized price may be used to update the price for the product in order to achieve the business objective criterion. For example, the information regarding the optimized price may be published (e.g., on a web page for the product). In embodiments, the information regarding the optimized price may be provided to the merchant server 220 so that the merchant server 220 may publish the optimized price.

Figure 11:
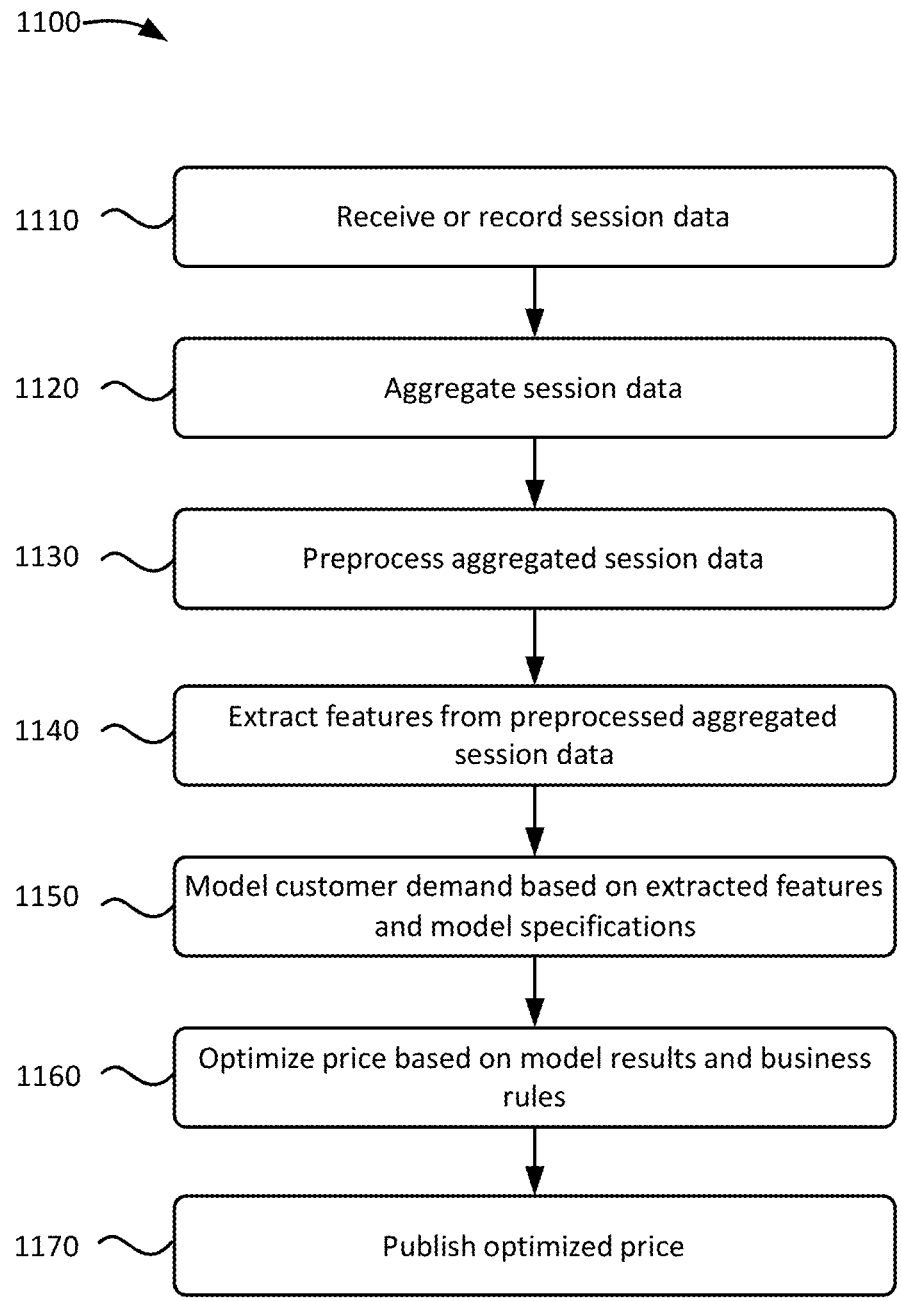
FIG. 11 shows an example flowchart for generating a customer demand model for a product based on session data, and optimizing price for a product based on the results of the customer demand model in accordance with aspects of the present invention.

FIG. 11 shows an example flowchart for generating a customer demand model for a product based on session data, and optimizing price for a product based on the results of the customer demand model. The steps of FIG. 11 may be implemented in the environment of FIGS. 4 and 5, for example, and are described using reference numbers of elements depicted in FIGS. 4 and 5. As noted above, the flowchart illustrates the architecture, functionality, and operation of possible implementations of systems, methods, and computer program products according to various embodiments of the present invention.

As shown in FIG. 11, process 1100 may include receiving or recording session data (step 1110). For example, as described above with respect to the session data recording module 1010, the demand modeling and pricing server 230 may receive or record session data. In embodiments, the demand modeling and pricing server 230 may record session data records and provide the data records to the demand modeling and pricing server 230. Additionally, or alternatively, the demand modeling and pricing server 230 may monitor session activity between client devices 210 and merchant server 220 and may record the session data into records. Examples of session data records are described above with respect to data structure 600 in FIG. 6.

Process 1100 may further include aggregating the session data (step 1120). For example, as described above with respect to the session data aggregation module 1020, the demand modeling and pricing server 230 may aggregate session data for multiple products corresponding to a particular each event type and day. In embodiments, the demand modeling and pricing server 230 may aggregate the session data by product ID, date, and time period, such that each aggregated record identifies an average price, shipping speed counts, average customer rating, and average quantity. Examples of aggregated session data are described above with respect to data structure 700 and data structure 750 in FIG. 7.

Process 1100 may also include preprocessing the aggregated session data (step 1130). For example, as described above with respect to the aggregated data preprocessing module 1030, the demand modeling and pricing server 230 may preprocess the aggregated data generated at step 1120.

For example, the demand modeling and pricing server 230 may preprocess the aggregated data by "filling in the blanks" or populating data (e.g., with substitute values) for which aggregated data does not exist in order generate a complete data set. Examples and further descriptions of preprocessing the aggregated data are described above with respect to data structure 800 in FIG. 8.

Process 1100 may further include extracting features from the preprocessed aggregated session data (step 1140). For example, as described above with respect to the feature extraction module 1040, the demand modeling and pricing server 230 may extract features from the preprocessed aggregated session data. In embodiments, the demand modeling and pricing server 230 may apply statistical operations to the preprocessed aggregated data to better represent customer demand. Additionally, or alternatively, feature extraction may include transforming a single data column, combining multiple columns into a single feature, and/or representing a single column in the form of one-hot encoded columns. Examples and further descriptions regarding extracted features are described above with respect to data structure 900 in FIG. 9.

Process 1100 may also include modeling customer demand based on extracted features and model specifications (step 1150). For example, as described above with respect to the customer demand modeling module 1050, the demand modeling and pricing server 230 may model customer demand using, for example, the extracted feature data generated by the feature extraction module 1040. In embodiments, the customer demand modeling module 1050 may model the customer demand to determine a level of customer demand based on model specifications provided by a user or analyst. For example, the customer demand modeling module 1050 may receive model specifications, such as the type of model to generate, the type of modeling algorithms to use, and the types of features to consider or disregard when generating the model.

Process 1100 may further include optimizing price based on model results and business rules (step 1160). For example, as described above with respect to the price optimization module 1060, the demand modeling and pricing server 230 may determine an optimized price for a product based on the results of the customer demand model generated by at step 1150. In embodiments, the demand modeling and pricing server 230 may determine an optimized price for a product further based on business rules received from an administrator. For example, the optimized price may be determined based on business rules or business objective criterion such as sales, revenue, profit, etc. Information regarding the optimized price may be used to update or modify the price for the product in order to achieve the business objective criterion. Additionally, or alternatively, information regarding the optimized price may be used to modify a marketing campaign for the product (e.g., devote more resources to a improve visibility of a low-demand item).

Process 1100 may further include publishing the optimized price (step 1170). For example, as described above with respect to the price optimization module 1060, the demand modeling and pricing server 230 may publish the optimized price (e.g., on a web page for the product). In embodiments, the information regarding the optimized price may be provided to the merchant server 220 so that the merchant server 220 may publish the optimized price.

In embodiments, the merchant may use information regarding the optimized price to deploy a marketing campaign that is based on the optimized price. For example, the marketing campaign may identify the optimized price (or a different price that may not necessarily be identical to the optimized price). In embodiments, the optimized price may further be used to adjust a business model, projections, or the like (e.g., projected number of sales in a given time period, or to adjust an input number of sales for a business model).

In embodiments, process 1100 may be repeated as browsing activity between the client devices 210 and the merchant server 220 continues and as more session data records are recorded/received. In this way, customer demand modeling is updated periodically, and accordingly, prices are continuously optimized and published.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by a computing device via computer network, a plurality of session data records indicating computer network browsing activity between a plurality of client devices and a merchant server hosting an online store, the plurality of session data records being recorded based on occurrences of shopping-related events including accessing a webpage describing a single product of a plurality of products, adding the single product to an online shopping cart, and purchasing the single product from the online shopping cart, and wherein each of the plurality of session data records corresponds to a particular shopping-related event and identifies a price of the single product, a shipping speed of the single product, and a customer feedback rating of the particular product at a time of the particular shopping-related event;

aggregating, by the computing device, a subset of the plurality of session data records for the single product, of the plurality of products, identified in the session data records and offered for purchase by the online store, the aggregated subset of session data records identifying demand activity for the single product by time period, including views of the single product, cart additions of the single product, and purchases of the single product, and further identifying an average price of the single product, an average shipping speed of the single product, and an average customer feedback rating of the single product within a particular time period when the single product was viewed, within a particular time period when the single product was added to the online shopping cart, and within a particular time period when the single product was purchased from the online shopping cart;

preprocessing, by the computing device, the aggregated subset of session data records by interpolating missing data for at least one time period;

extracting, by the computing device, features from the aggregated subset of session data records relating to customer demand for the single product, the features including at least one from the group consisting of a centered average user rating and a log value of a quantity of items purchased;

modeling, by the computing device, customer demand for the single product based on the extracted features and using a regression of sales versus price;

determining, by the computing device, an optimized price for the single product based on results of the modeling and rules provided by an administrator; and publishing, by the computing device, the optimized price on the webpage describing the single product.

2. The method of claim 1, wherein the extracting the features includes:
transforming a single data column;
combining multiple columns into a single feature; and
representing a single column as one-hot encoded columns.

3. The method of claim 1, wherein the modeling is further based on model specifications provided by an administrator, wherein the model specifications comprise at least one selected from a group consisting of:
a type of model to generate;
a type of modeling algorithms to use for generating the model; and
types of features to consider, disregard, or weigh more heavily when modeling the customer demand.

4. The method of claim 1, wherein the rules provided by the administrator comprise at least one business rule selected from a group consisting of:
sales;
revenue; and
profit.

5. The method of claim 1, wherein the preprocessing the aggregated subset of session data records comprises populating data for which aggregate data does not exist based on the interpolating missing data, wherein the extracting is based on preprocessing the aggregated session data records.

6. The method of claim 1, wherein each of the plurality of session level data records further includes data comprising:
a session identifier;
a product identifier of the single product;
date and time of a shopping-related event; and
a quantity of the single product.

7. The method of claim 6, wherein the aggregated subset of session data records further includes average quantities for the single product across the plurality of session data records.

8. The method of claim 1, further comprising updating the model for customer demand based on receiving updated session data records as browsing activity between the plurality of client devices and the merchant server continues.

9. The method of claim 8, further comprising:
repeating, by the computing device, the determining the optimized price for the single product based on results of the updating the model such that the optimized price is adjusted based on short term changes in demand; and
repeating, by the computing device, the publishing the optimized price on the webpage describing the single product.

10. The method of claim 9, further comprising:
modifying, by the computing device, a marketing campaign for the single product to identify the optimized price; and
adjusting, by the computing device, a projected number of sales of the single product in a particular time period based on the optimized price, and
wherein the rules provided by the administrator comprise business rules based on sales, revenue, and profit.

11. The method of claim 1, wherein a service provider at least one of creates, maintains, deploys and supports the computing device.

12. The method of claim 1, wherein steps of claim 1 are provided by a service provider on a subscription, advertising, and/or fee basis.

13. The method of claim 1, wherein the computing device includes software provided as a service in a cloud environment.

14. The method of claim 1, further comprising deploying a system for modeling customer demand based on the plurality of session data records and the determining the optimized price, comprising providing a computer infrastructure operable to perform the steps of claim 1.

15. A computer program product for modeling customer demand based on a plurality of session data records and optimizing price, the computer program product comprising a non-transitory computer readable storage medium having program instructions embodied therewith, the program instructions executable by a computing device to cause the computing device to:
monitor computer network browsing activity between a plurality of client devices and a merchant server;
generate the plurality of session data records having details regarding the computer network browsing activity between the plurality of client devices and the merchant server hosting an online store, the plurality of session data records being generated based on occurrences of shopping-related events including accessing a webpage describing a single product of a plurality of products, adding the single product to an online shopping cart, and purchasing the single product from the online shopping cart, and wherein each of the plurality of session data records corresponds to a particular shopping-related event and identifies a price of the single product, a shipping speed of the single product, and a customer feedback rating of the particular product at a time of the particular shopping-related event;
aggregate a subset of the plurality of session data records for the single product, of the plurality of products, identified in the session data records and offered for purchase by the online store, the aggregated subset of session data records identifying demand activity for the single product by time period, including views of the single product, cart additions of the single product, and purchases of the single product, and further identifying an average price of the single product, an average shipping speed of the single product, and an average customer feedback rating of the single product within a particular time period when the single product was viewed, within a particular time period when the single product was added to the online shopping cart, and within a particular time period when the single product was purchased from the online shopping cart;

preprocess the aggregated subset of session data records by interpolating missing data for at least one time period;

extract features from the aggregated subset of session data records relating to customer demand for the single product, the features including at least one from the group consisting of a centered average user rating and a log value of a quantity of items purchased;

model customer demand for the single product based on the extracted features and using a regression of sales versus price;

a determine an optimized price for the single product based on results of the modeling and rules provided by an administrator; and publish the optimized price on the webpage describing the single product.

16. The computer program product of claim 15, wherein:
the preprocessing the aggregated subset of session data records comprises populating data for which aggregate data does not exist based on the interpolating missing data; and
the extracting is based on preprocessing the aggregated session data records.

17. The computer program product of claim 15, the program instructions further cause the computing device to update the model for customer demand based on receiving updated session data records as browsing activity between the plurality of client devices and the merchant server continues.

18. The computer program product of claim 15 wherein the plurality of session level data records each include data selected from a group consisting of:
a session identifier;
a product identifier of the single product;
date and time of a shopping-related event; and
a quantity of the single product.

19. A system comprising:
a CPU, a computer readable memory and a non-transitory computer readable storage medium associated with a computing device;

program instructions to gather session level data from online customer retail activity, the session level data being gathered based on occurrences of shopping-related events including accessing a webpage describing a single product of a plurality of products, adding the single product to an online shopping cart, and purchasing the single product from the online shopping cart, and wherein the session level data corresponds to shopping-related events and identifies a price of the single product, a shipping speed of the single product, and a customer feedback rating of the particular product at a time of each of the shopping-related events;

program instructions to aggregate, for the single product, the session level data pertaining to the single product, the aggregated session level data identifying demand activity for the single product by time period, including views of the single product, cart additions of the single product, and purchases of the single product, and further identifying an average price of the single product, an average shipping speed of the single product, and an average customer feedback rating of the single product within a particular time period when the single product was viewed, within a particular time period when the single product was added to the online shopping cart, and within a particular time period when the single product was purchased from the online shopping cart;

program instructions to substitute values by interpolation as a replacement for missing data in the aggregated session level data to generate a complete data set;

program instructions to extract one or more features of online customer behavior based on an analysis of the complete data set, the features including at least one from the group consisting of a centered average user rating and a log value of a quantity of items purchased;

program instructions to determine a level of customer demand for the product based on the one or more features of online customer behavior and using a regression of sales versus price; and program instructions to determine a modified price of the product on the webpage describing the single product based on the level of customer demand and rules provided by an administrator, wherein the program instructions are stored on the computer readable storage medium for execution by the CPU via the computer readable memory.

20. The system of claim 19, further comprising program instructions to modify a marketing campaign for the product based on the level of customer demand.

* * * * *